ELECTRIC SIGNAL INTEGRATING APPARATUS

Filed Dec. 21, 1966 2 Sheets-Sheet 1

INVENTOR
RICHARD CARLILE MARSHALL
BY Young & Thompson
ATTYS

United States Patent Office 3,525,093
Patented Aug. 18, 1970

3,525,093

ELECTRIC SIGNAL INTEGRATING APPARATUS

Richard Carlile Marshall, Harpenden, England, assignor to George Kent Limited, Luton, Bedfordshire, England, a British company Filed Dec. 21, 1966, Ser. No. 603,629
Claims priority, application Great Britain, Dec. 23, 1965, 54,634/65
Int. Cl. H03k 13/17
U.S. Cl. 340—347 17 Claims

ABSTRACT OF THE DISCLOSURE

Method and apparatus for providing output signals suitable for operating a digital counter and representing continuous integration of an analogue input, e.g. an electric signal, in which the output of an integrator supplied with the analogue input is interrogated at predetermined time intervals and then reset towards zero by applying one of a number of available reset signals of known but different integral values, the choice of reset signal being determined by the examined integrator output amplitude and being accompanied by the release of a related output signal indicative of the integral value of the chosen reset signal.

Figures 1, 2:
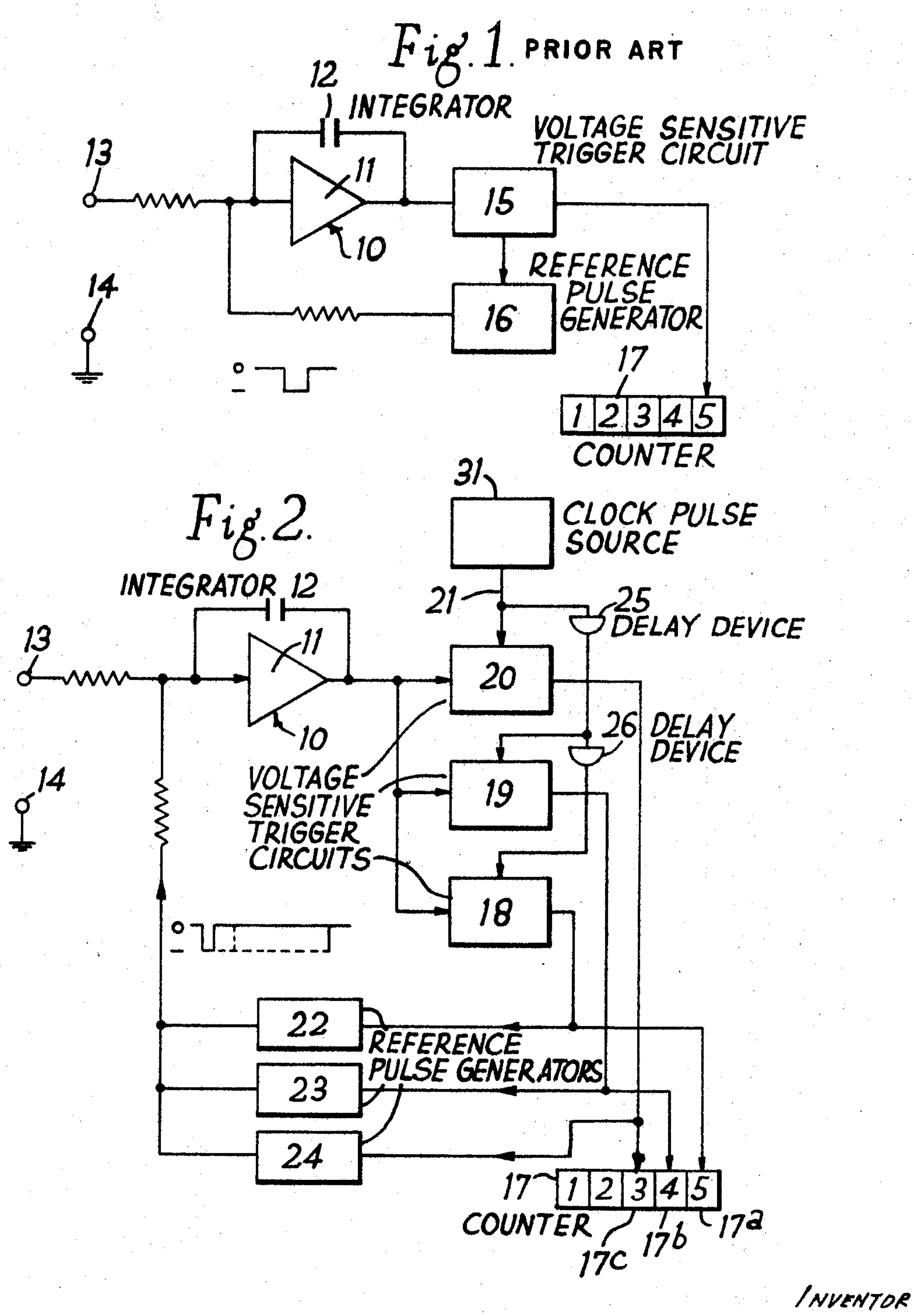

This invention relates to a method of an apparatus for effecting integration of signals, particularly, although not exclusively, analogue electric voltage or current signals with respect to time and therefrom providing an output signal, for instance one which is in digital form, suitable for effecting operation of other means, such as registering or recording means. Such output signal may readily be made of a form which is capable of being transmitted over a considerable distance without need for elaborate equipment to preserve the accuracy of the original input signal.

The present invention is particularly applicable to the integration of electric signal voltages or currents which may vary over a wide range of amplitudes, such as those received from a gas chromatograph. Gas chromatographs commonly provide output voltage signals whose amplitudes may be anywhere within the range of between 10 $\mu$v. and 10 mv.

Integration systems of the above general kind are already known in which an analogue integrator, such as a "Miller" integrator circuit, is employed and is arranged to be reset towards zero by a suitable signal of known volt-time product value from a reference circuit whenever the output from the integrator exceeds a predetermined chosen level. The reset signal is also used to update, by a corresponding amount, an associated counter used for displaying the integral value in digital terms.

The range of input voltages over which such a form of instrument is useful is limited, on the one hand, by the maximum permissible count rate of the counter (which is frequently of electro-mechanical form) and, on the other hand, by the small number of counts which are necessarily accumulated within a given period of time when the input is of low value and the chosen integrator output voltage level at which re-setting occurs is at the same mite made large on account of the need to restrict the count rate demanded from the counter under maximum input conditions.

One object of the present invention is to provide an improved method of operation and appropriate apparatus arrangements by which the range of acceptable input signal amplitudes can be made wide while still providing for frequent output signals, e.g. for effecting readjustment of a counter or other operated means, when the input level is at a minimum value.

In accordance with the broadest aspect of the present invention an integrator connected to be supplied with the signal to be integrated is arranged to be interrogated at predetermined intervals of time and then re-set by an amount which is variable and is chosen in accordance with the particular value of the integrator output at each instant of interrogation.

In one particular form of the invention as applied to electric signals a plurality of different re-set signals, each of known volt-time product value, are made available and at each of said periodic interrogations of the output signal from the integrator, an appropriate one or more of such available re-set signals is/are selected and fed to the integrator in accordance with the determined level of the integrator output voltage.

The selected re-set signal or signals may also be used to provide representative output signals. For example, the selected signal or signals may be used to effect up-dating of a counter by an amount which is in accordance with the assigned value of the released re-set signal or signals.

In one preferred apparatus arrangement according to the invention at least two and preferably three or more re-set signals are made available from appropriate reference pulse generators and the respective volt-time product values of such re-set signals arranged to have a decimal relationship to one another, so that if one re-set signal represents a single unit, another re-set signal represents ten units and the third re-set signal, if provided, represents one hundred units. A clock pulse generator may be used to provide a series of interrogation pulses at constant time intervals and these pulses arranged each to set to operative condition an equivalent number of otherwise inhibited trigger circuits. Such trigger circuits are arranged so that the necessary amplitudes of their respective release input signals are different from one another and have the same decimal relationship as the related re-set signals. Such trigger circuit inputs are each arranged to be supplied, for use as its release input signal, with the integrated voltage output from the integrator. The arrangement is such that the particular one (or more) of said trigger circuits which is triggered upon arrival of a clock pulse then causes the release of the related reference pulse to effect re-setting of the integrator at its input by a corresponding amount. At the same time such release of a reference pulse causes advancement of the related count stage of a decimal counter by one step.

The integrator output may be tested for the attainment thereby of the two or more pre-set levels either simultaneously or successively. Thus means may be provided for scanning the outputs from associated voltage level testing means connected to the integrator output in order to determine which is the appropriate one of the available re-set signals for use in re-setting the integrator and advancing the counter. More conveniently, however, each of the basic clock pulse signals is arranged to cause interrogation of the different trigger circuits or other level testing means in turn by deriving from each clock pulse a series of time separated or phase-delayed pulses which are used one for each of the trigger circuits or like testing means whereby the latter are interrogated in turn in descending order of the related re-set pulse values. Every one of the different level testing means may be interrogated in turn at each clock pulse interval in which case the time delay between the interrogation of any one of such level testing means and the next must be made sufficient to allow any re-set pulse released by any one means to complete its re-setting effect upon the integrator output to a new and lowered level before interrogation of the next available means takes place. More preferably however the cycle of sequential interrogation of the various level testing means is caused to be inhibited immediately any re-set pulse is released. In this way only a single re-set pulse of a value corresponding to the most significant of the available test levels to be exceeded by the value of the integrator output is produced at each interrogation. This allows the delay between the interrogation of the different level testing means to be made very small so that the re-set pulse itself may occupy a large proportion of the time interval between successive interrogations.

Figures 3, 4:
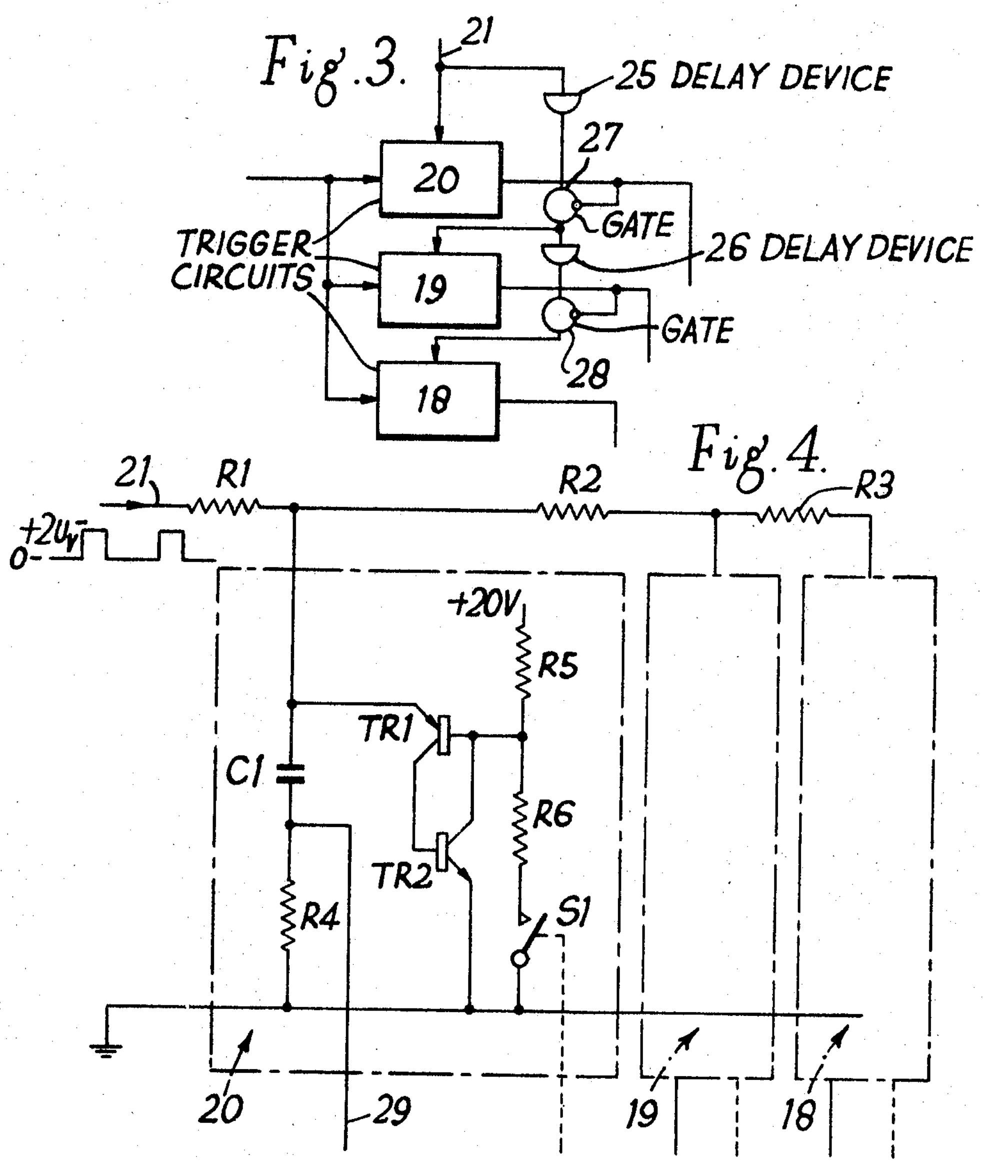
Figure 5:
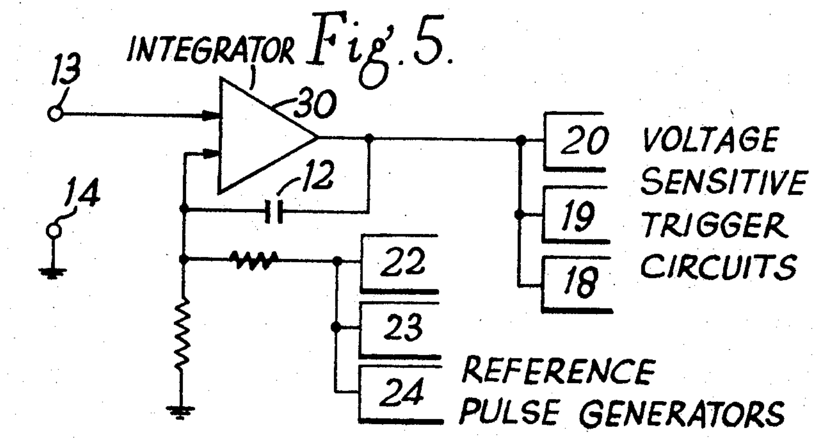

The above and other features of the invention will be better understood from the following description of, firstly, a known prior art arrangement and thereafter several arrangements in accordance with the invention. This description is given by way of illustrative example only and with reference to the accompanying drawings in which:

FIG. 1 is a largely block schematic form, circuit diagram illustrating one known form of integrating system, FIG. 2 is a similar, largely block schematic form, diagram illustrating one embodiment of the present invention, FIG. 3 is a fragmentary and largely block schematic form diagram, illustrating an alternative arrangement in accordance with the invention otherwise similar to FIG. 2, FIG. 4 is a more detailed circuit diagram showing one practical form of the arrangement shown in FIG. 3, while FIG. 5 is a further fragmentary block schematic diagram illustrating yet another arrangement according to the invention.

Referring first to FIG. 1, this shows one known arrangement comprising a "Miller" type analogue integrator 10 including an amplifier 11 with feedback capacitance 12 connected between the amplifier output and input and to which the analogue voltage which is to be integrated is applied between input terminals 13, 14, the voltage at terminal 13 being positive with respect to terminal 14. The integrator output is applied to the input of a trigger circuit 15 which is arranged to change state whenever the applied input voltage reaches a chosen predetermined value. An output signal from the trigger circuit 15, present each time such circuit is operated by the integrator output, is fed as a triggering input signal to a reference pulse generator 16 which provides, in response to each triggering thereof, a negative-going pulse signal of known volt-time product. Each of such output pulses is fed to the input of the integrator 10 thereby to re-set the output of the latter to a given lower value. The trigger circuit 15 also provides, at each of such operations, an operating pulse to the units stage of a counter circuit 17. Each counter operating pulse causes an increase of the count state by the value "1."

In the operation of such known arrangement the application of an analogue input signal having a volt-time product equal to that of the last applied re-set pulse, results in the above described operation being again repeated to cause similar re-setting and further advancement of the counter by one unit and so on for as long as an active input signal is present. With such an arrangement the maximum count rate of the counter 17 determines the maximum permissible input to the integrator 10 since, if this count rate is exceeded, the counter may operate incorrectly. If, however, the integrator input is very low then a long time period will necessarily elapse between successive operations of the trigger circuit 15; the related operations of the counter 17 will likewise be separated by long periods of time. Towards the end of each of such long time periods, the counter indication clearly may be considerably out-of-date relative to the input to the integrator.

FIG. 2 illustrates one arrangement according to the invention. The integrator circuit 10, also of the "Miller" type, is supplied as before with a positive-going analogue voltage by way of input terminals 13, 14, but its output is applied in parallel to the triggering input terminal of each of three separate trigger circuits 18, 19 and 20. The amplitude of the input release signal needed for the trigger circuit 19 is arranged to be ten times that required by the trigger circuit 18 while the amplitude of the input release signal needed for the trigger circuit 20 is arranged to be one hundred times that required by the trigger circuit 18 whereby such trigger circuits 18, 19, 20 will change state at three different levels of input voltage having the relationship of 1/10/100 to each other. Each trigger circuit is arranged, e.g. by application of a cut-off bias potential, whereby it is normally held inoperative but can be brought to operative condition in which it will be triggered if its release signal is of sufficient amplitude by an interrogation pulse provided over lead 21 from a suitable clock pulse generator 31 which is arranged to supply suitable pulses at regular time intervals.

Each output pulse from trigger circuit 18, having the lowest or 1 unit input release signal level, is applied as a triggering signal to a reference pulse generator 22 which provides a corresponding negative-going re-set pulse, having a one unit volt-time product value, to the input of the integrator 10. The same or another output from the trigger circuit 18 is fed to the unit count stage **17*a* of the counter 17 where it operates to advance the count of the latter by "1." Each output pulse from the trigger circuit 19 having the 10-unit input release signal level is similarly applied as a triggering signal to a second reference pulse generator 23 which provides a negative-going re-set pulse, having a 10-unit volt-time product value, to the input of the integrator 10 while an output from the same trigger circuit 19 is fed to the tens count stage 17*b* of the counter 17 where it operates to advance the count of the latter by "10." Each output pulse from the third trigger circuit 20 having the 100-unit input release signal level is applied as a triggering signal to a third reference pulse generator 24 which provides a negative-going re-set pulse, having a 100-unit volt-time product value, to the input of the integrator 10 while an output from the same trigger circuit 20 is also fed to the hundreds count stage 17*c* of the counter 17** where it operates to advance the count of the latter by "100."

In the preferred arrangement as shown, the clock pulses supplied to the three trigger circuits are time-separated or phase delayed relative to one another by the inclusion of a signal delay device 25 between the clock pulse input lead 21 and the trigger circuit 19 and the inclusion of such delay device 25 and a further signal delay device 26 between the clock pulse input lead 21 and the trigger circuit 18. Each clock pulse is thus effective upon the trigger circuit 20 before it becomes effective upon the trigger circuit 19, while the latter event, in turn, occurs before the clock pulse can be effective on the trigger circuit 18.

In the operation of this embodiment, at each chosen clock pulse interval the 100-unit integrated signal amplitude level is first tested by bringing the trigger circuit 20 to operative condition by means of the interrogating clock pulse. If the integrator output is below such level at the instant of interrogation, the trigger circuit 20 will not be operated and, after delay of the clock pulse, will again become inhibited but if the integrator output has, at that instant of interrogation, reached or exceeded the 100-unit level, this trigger circuit 20 will be operated and will cause the delivery of a count pulse to the 100's stage **17*c* of the counter 17 to up-date the latter by 100 units and at the same time will cause the supply of a 100-unit re-set pulse from the generator 24 thereby to re-set the integrator output to a level 100 units lower than it was previously. Upon the subsequent arrival of the same but delayed clock pulse at the trigger circuit 19 the latter will be brought to operative condition but will be operated only if the integrator output is, at this instant, above the 10-unit level; if it is above such level then the 10's stage 17*b* of the counter 17 will be operated and a 10-unit re-set pulse will be released from the generator 23 and applied to the integrator 10 thereby re-setting the integrator output to a level 10 units lower than previously. In similar manner, at the still later instant of arrival of the third, most delayed, clock pulse at the trigger circuit 18, this will likewise be conditioned but will be operated only if the integrator output is at that instant above the chosen one unit level. If so, a unit re-set pulse is supplied by generator 22 to the input of the integrator and the unit stage 17***a* of the counter 17 is operated one step.

With the arrangement as just described the time delay imposed by each of the delay devices 25 or 26 must be sufficient to allow the output from the integrator circuit 10 to become stabilised at its new, lowered, value consequent upon the provision of a re-set pulse from the generator 24 or 23, respectively before the interrogating clock pulse arrives at the next trigger circuit 19 or 18. The time available for such re-set pulses is accordingly restricted unless the imposed delays are made large. An alternative arrangement for avoiding this disadvantage is shown in FIG. 3 which is a fragmentary block schematic diagram of a modified portion of FIG. 2.

In this modification, inhibitory gating means 27 controlled by the signal output from the 100-unit trigger circuit 20 is inserted between the delay device 25 and the interrogation signal input to the 10-unit trigger circuit 19 while similar inhibitory gating means 28 controlled by the output from the 10-unit trigger circuit 19 is inserted between the delay means 26 and the interrogation signal input to the 1-unit trigger circuit 18.

The operation of this modified arrangement resembles that of the embodiment of FIG. 2 except that, if the integrator output exceeds the 100-unit level, the operation of the trigger circuit 20, in addition to causing the release of a 100-unit re-set pulse and the up-dating of the counter 17 by 100 units, also causes closure of the gating means 27 whereby the interrogation pulse is suppressed and the subsequent trigger circuits 19 and 18 are not operated even if the interrogator output itself exceeds 110 or 111 units. Only one re-set pulse, of 100-unit value, is fed to the integrator 10. Similarly, if the integrator output exceeds 10 units but is less than 100 units, the trigger circuit 20 will remain untriggered and the gating means 27 left open to cause interrogation of the trigger circuit 19 with releas eof a 10-unit re-set pulse and up-dating the counter by 10 units. In such case, interrogation of the trigger circuit 18 and the possible release of a 1-unit re-set pulse is prevented by closure of the gating means 28 even if the integrator output level exceeds 11 units.

A practical circuit form of the schematic arrangement shown in FIG. 3 is illustrated in FIG. 4 where the 100-unit trigger circuit 20 is shown in detail and includes a regenerative complementary transistor pair TR1, TR2 arranged each with its collector cross-connected to the base of the other transistor. The input clock pulses (+20 v. amplitude) on lead 21 are applied through resistor R1 (1KΩ) to cause charging of capacitor C1 (0.01μf) through resistor R4 (47Ω). The base of transistor TR1 is connected to a +20 v. reference voltage source through resistor R5 (10KΩ) and by way of resistor R6 (10KΩ) and switch means S1 to the zero or earth-line. Switch means S1 is arranged to be controlled by the voltage sensing means connected across the integrator output; such switch means is closed when such integrator output exceeds the 100-unit level.

The circuit arrangements of the 10-unit and 1-unit trigger circuits 19 and 18 (FIG. 3) are identical with that of the 100-unit circuit as shown.

If switch S1 is closed, the base voltage of transistor TR1 is lowered to +10 v. so that, upon arrival of a clock pulse (+20 v. amplitude) the emitter of transistor TR1 goes positive with respect to its base and the regenerative pair is triggered sharply on. This causes discharge of capacitor C1 and the voltage appearing across resistor R4 provides a negative-going output pulse on lead 29 for triggering the 100-unit re-set pulse generator 22 (FIG. 2) and up-dating the associated counter stage 17*c*. The emitter current of the transistor TR1 remains at a value sufficient to hold the pair TR1, TR2 set on until the clock pulse ceases. Under these conditions, the corresponding capacitors C1 of the 10- and 1-unit trigger circuits 19, 18, although they also begin charging through resistors R2 and R3 (220Ω), will be discharged again before they reach +10 v. level and neither of the related regenerative transistor pairs of such trigger circuits will be set on. In the case where the switch S1 of the 100-unit trigger circuit is not closed owing to the integrator output being below the 100-unit level, the capacitor C1 of this trigger circuit will charge up during the whole of clock pulse period but cannot reach the level of above +20 v. now needed to turn the transistor TR1 on. A similar manner of operation occurs in the 10-unit and 1-unit circuits 19 and 18.

In another alternative arrangement embodying the invention the clock pulses may be applied to the three trigger circuits or other level testing means simultaneously and the outputs from these circuits scanned to determine which is the highest value one to have been operated. The selected circuit is arranged then to control the application of an operative signal to the appropriate stage of the counter and the supply of the related re-set pulse to the integrator.

The level testing means for examining the integrator output may take any suitable known form, for instance, a number of suitably biased Schmitt trigger circuits may be used.

Voltage sensing means, for instance, another Schmitt trigger circuit, are preferably also provided to detect any rise of the integrator output above a selected level of, say, 200 units. Similarly, the integrator output may be connected also to voltage polarity sensing means which are operated if the available output signal goes negative instead of positive. Operation of either of these sensing means is arranged to cause operation of fault or alarm means indicating the existence of some undesirable condition.

Other forms of integrator circuit may clearly be employed. FIG. 5 illustrates one alternative form of the so-called "bootstrap" type employing a differential amplifier 30 to one input of which is applied the analogue input signal from terminals 13, 14 and to the other of which is applied the feedback signal by way of capacitor 12 from the amplifier output and the re-setting reference pulses from the reference pulse generators 22, 23 and 24 arranged as in FIG. 2.

The counter may be of any suitable form capable of being re-set independently at different count stages. For example, such counter may be an electro-mechanical device in which at least several of its count wheels of lower digital significance are equipped with separate drive solenoids. The counter may be of the print-out type and may incorporate means for initiating each print-out cycle as described in co-pending application No. 568,157, filed July 27, 1966, now abandoned.

While the invention has been more particularly described with relation to operation of a counter and using a group of different re-set pulses having a decimal relationship to one another, it will be apparent that the invention is also applicable to transmission of analogue integrals over a distance by means of distinctive signals generated under the control of the different level sensing means and with re-set pulses having other than a decimal, e.g. a binary, relationship.

While the invention has been particularly described with relation to the integration of electric signals it will be apparent that the basic principle is equally applicable to other form of signal in which mechanical equivalents of the electric components can be provided, for example, in a mechanico-pneumatic system, and arranged to operate in analogous manner.

I claim:

1. Apparatus for continuously integrating an analogue form electric signal with respect to time and therefrom providing a series of output signals representative of updating increments to the measured integral value, which apparatus comprises an integrator circuit having an input connected for supply with the input signal and an integrated signal output, means for generating reset pulses of any of a plurality of volt-time product values, cyclically operating sensing means coupled to said integrated signal output of said integrator circuit and operative to detect, at each of successive predetermined interrogation intervals the value of the output voltage at said integrated signal output, reset pulse supply means controlled by said sensing mean and operative to select from said reset pulse signal source and apply to said integrator circuit input a reset pulse signal chosen in accordance with the sensed output voltage and having volt-time at least the largest of said plurality of product values which will reset the integrator circuit output towards but not beyond zero, output signalling means, and means for varying the value stored in said output signalling means by an amount corresponding to the volt-time product value of the applied reset signal.

2. Apparatus according to claim 1, said reset pulse supply means comprising means for providing a plurality of different reset signals each of a predetermined volt-time product value and in which, at each of said interrogation intervals, at least one of said available reset signals is selected and fed to said integrator circuit.

3. Apparatus according to claim 2 in which the volt-time product values of said different reset signals have a decimal relationship to one another.

4. Apparatus according to claim 1, said output signalling means comprising a digital counter arranged to be updated by each output signal in accordance with the chosen reset amount.

5. Apparatus according to claim 4 in which said digital counter has separate means for advancing the count state of the number display for at least two of its least significant digit display positions and in which said seperate count state advance means is operated by the related output signal.

6. Apparatus according to claim 4 in which said counter is a print-out device.

7. Apparatus according to claim 1, and means for testing the integrator circuit output signal during each interrogation for the presence of a plurality of different predetermined amplitude levels in decreasing order of magnitude.

8. Apparatus according to claim 7, and means for inhibiting the application of a second reset signal to said integrator circuit during any one interrogation.

9. Apparatus according to claim 1 in which said integrator circuit comprises a circuit of the "Miller" type.

10. Apparatus according to claim 1 in which said integrator circuit comprises a circuit of the "bootstrap" type.

11. Apparatus according to claim 1, said sensing means comprising a plurality of trigger circuit devices each connected to be supplied with the output signal from said integrator circuit and each adapted to change state at appropriately different levels of input signal amplitude, said trigger circuit devices being also normally inoperative and being brought to operative condition by an applied interrogation signal.

12. Apparatus according to claim 11, said source of reset pulse signals comprising a clock pulse generator for supplying a series of interrogation pulse signals to control the operative states of said trigger circuit devices.

13. Apparatus according to claim 11, said reset pulse supply means comprising a similar plurality of reference pulse generator devices, each adapted to be triggered by an output from a related one of said trigger circuit devices to provide an output reset pulse to the input of said integrator circuit which is of chosen volt-time product value related to the effective amplitude of input signal for the trigger circuit device by which it is controlled.

14. Apparatus according to claim 13, and signal delay means in the supply paths of said interrogation pulse signals to those trigger circuit devices which control reference pulse generators whose reset pulse are of lower volt-time product value whereby interrogation of such trigger circuit devices occurs successively in decreasing order of volt-time product value of the related reset pulses.

15. Apparatus according to claim 14, and control gate circuit means in those interrogation pulse supply paths which include said signal delay means, said gate circuit means being each controlled by signals derived from the trigger circuit device which is in order to be interrogated immediately prior to that supplied through such gate circuit means so as to inhibit the passage of an interrogation pulse signal whenever said prior trigger circuit has been triggered.

16. Apparatus according to claim 1, and voltage sensing means connected to monitor the integrator circuit output signal amplitude to detect rise of such output amplitude above a predetermined amplitude level.

17. Apparatus according to claim 1, and signal polarity sensing means connected to the output of said integrator circuit to detect reversal of polarity of said integrator output signal.

References Cited

UNITED STATES PATENTS

| | | | |
|---|---|---|---|
| 2,754,503 | 7/1956 | Forbes | 340—347 |
| 3,048,336 | 8/1962 | Ritzenhaler | 235—183 |
| 3,182,303 | 5/1965 | Howe | 340—347 |
| 3,188,455 | 6/1965 | Quick | 235—183 |
| 3,255,447 | 6/1966 | Sharples | 340—347 |
| 3,368,149 | 2/1968 | Wasserman | 324—111 X |
| 3,414,898 | 12/1968 | Barton | 340—347 |
| 3,439,271 | 4/1969 | Metcalf et al. | 324—111 |
| 3,439,272 | 4/1969 | Bailey et al. | 340—347 X |

MAYNARD R. WILBUR, Primary Examiner

G. R. EDWARDS, Assistant Examiner